(12) United States Patent
Franklin et al.

(10) Patent No.: US 8,086,779 B2
(45) Date of Patent: Dec. 27, 2011

(54) DATA RECORDER FOR MULTIPLE MEDIA FORMATS

(75) Inventors: Russell O. Franklin, New Market, MD (US); Douglas Jaeger, Fairfax, VA (US)

(73) Assignee: Signal Storage Innovations, L.L.C., New Market, MD (US)

( * ) Notice: Subject to any disclaimer, the term of this patent is extended or adjusted under 35 U.S.C. 154(b) by 8 days.

(21) Appl. No.: 12/517,263

(22) PCT Filed: Dec. 4, 2007

(86) PCT No.: PCT/US2007/086363
§ 371 (c)(1),
(2), (4) Date: Jun. 2, 2009

(87) PCT Pub. No.: WO2008/070651
PCT Pub. Date: Jun. 12, 2008

(65) Prior Publication Data
US 2010/0077122 A1 Mar. 25, 2010

Related U.S. Application Data

(60) Provisional application No. 60/868,425, filed on Dec. 4, 2006.

(51) Int. Cl.
*G06F 13/20* (2006.01)
*G06F 13/00* (2006.01)

(52) U.S. Cl. ......... 710/301; 710/305; 710/313; 710/315
(58) Field of Classification Search .................. 710/300
See application file for complete search history.

(56) References Cited

U.S. PATENT DOCUMENTS

| | | | |
|---|---|---|---|
| 5,887,145 A * | 3/1999 | Harari et al. ................. | 710/301 |
| 6,418,097 B1 | 7/2002 | Schell et al. | |
| 7,039,742 B1 * | 5/2006 | Lada et al. .................... | 710/301 |
| 2005/0078944 A1 | 4/2005 | Risan et al. | |
| 2006/0184758 A1 * | 8/2006 | Satori et al. .................... | 711/168 |
| 2009/0163079 A1 * | 6/2009 | Nguyen .................. | 439/607.41 |

* cited by examiner

*Primary Examiner* — Ryan Stiglic
(74) *Attorney, Agent, or Firm* — Barnes & Thornburg LLP (57) ABSTRACT

A data recorder includes an I/O port, a host processor and a cartridge including a media storage and a media processor connected to the media storage. The media processor includes media capability data which is specific to the media storage. A bus connector removable connects the cartridge to the recorder, and the media processor and the host processor are connected to the connector by a Pathway Bus. When the cartridge is connected to the connector, the media capability data is transmitted from the media processor to the host processor and the host processor communicates data with the media processor as a function of the received media capability data.

14 Claims, 8 Drawing Sheets

DATA RECORDER FOR MULTIPLE MEDIA FORMATS

BACKGROUND AND SUMMARY

The present data recorder is directed generally to recording data on removable cartridges and more specifically to recording data on removable cartridges having different media formats.

The present data recorder is directed to providing a generalized system and method for enabling the disassociation of media type in a processing, storage, and retrieval system to adapt to any storage media. In accordance with exemplary embodiments, a framework for such a system is based on physical, electrical, and software disassociation of the specific media via media-independent electrical connectivity, media description messaging and categorization.

The present data recorder includes an I/O port for receiving data to be stored and outputting data to be read; and a cartridge including individual media devices contained in a media storage and a media processor connected to the media storage. The media processor includes media capability data which is specific to the media storage. A host processor is connected to the I/O port. A bus connector removable connects the cartridge to the recorder, and the data processor and the host processor are connected to the connector by a Pathway Bus. When the cartridge is connected to the connector, the media capability data is transmitted from the media processor to the host processor and the host processor communicates data with the media processor as a function of the received media capability data.

The media capability data may include one or more of average sustained read and write rate, burst block-buffer read and write rate, burst block-buffer read and write depth, bulk erase capability and total storage capacity. The host processor transmits commands to the media processor and the media processor transmits status to the host processor. The host processors commands may include one or more of write data block to file, read data block from file, bulk erase of media; and eject media. The media processor status may include one or more of action ID, action complete, media inactive and media present. The host processor commands may also include delete file, create file, rename file and set file properties and the media processor transmits one or more of directory listing and file properties.

The data recorder may include a plurality of cartridges each having the same or different media storage types; and wherein the media processor is programmed to control and communicate with the specific media type or types in the cartridge and to communicate with the host processor in a consistent manner regardless of the media type contained within the cartridge.

The connector may include multiple Pathways Buses and the host and media processor having either unidirectional or bidirectional modes of communication. In the bidirectional mode, one bus is used for communication in one direction and the other bus in the opposite direction simultaneously. In the unidirectional mode, both buses operate for communication in the same direction simultaneously.

The data recorder may include a second cartridge having a media storage and a media processor containing media capability information connected to the media storage. A second bus connector removable connects the second cartridge to the recorder and the second media processor to the host processor by the Pathway Bus.

The cartridge may include a plurality of media storages connected to a respective media processor; and the media processor being connected to the bus connector. The media cartridge includes power and data buffers capable of meeting requirements of the media storage in the cartridge. The requirements of the media storage include but are not limited to write latencies, spin-up, spin-down, thermal warm-up, and phase change stabilization.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
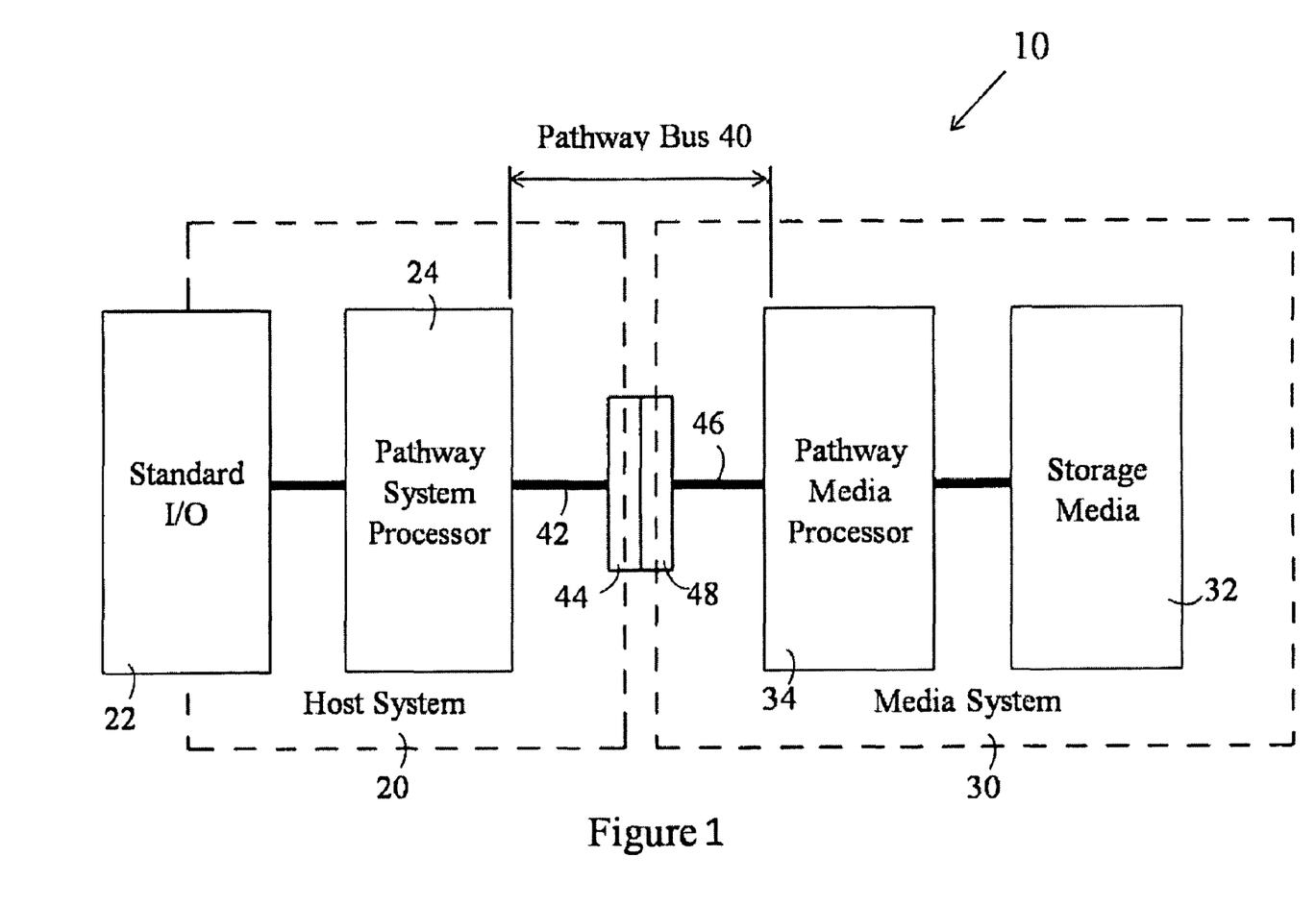
FIG. 1 is a schematic representation of a data recorder for a single cartridge with a single media storage according to the present disclosure.

As illustrated in FIG. 1, the present data recorder 10 includes a host system 20 and a media system 30. The host system 20 has a standard I/O port 22 for receiving data to be stored and outputting data to be read and host or Pathway system processor 24 connected to the I/O port 22. The media system or cartridge 30 includes a media storage 32 and a Pathway media processor 34 connected to the media storage 32. The media processor 34 includes media capability data which is specific to the media storage 32. A Pathway Bus 40 includes a pair of connectors 44 and 48 removable connecting the cartridge 30 to the host system 20. The host processor 24 and the media processor 34 are connected to the connectors 44 and 48 by a Pathway Buses 42 and 46 respectively. When the cartridge 30 is connected to the connector, the media capability data is transmitted from the media processor 34 to the host processor 24 and the host processor 24 communicates data with the media processor 34 as a function of the received media capability data.

Figure 2:
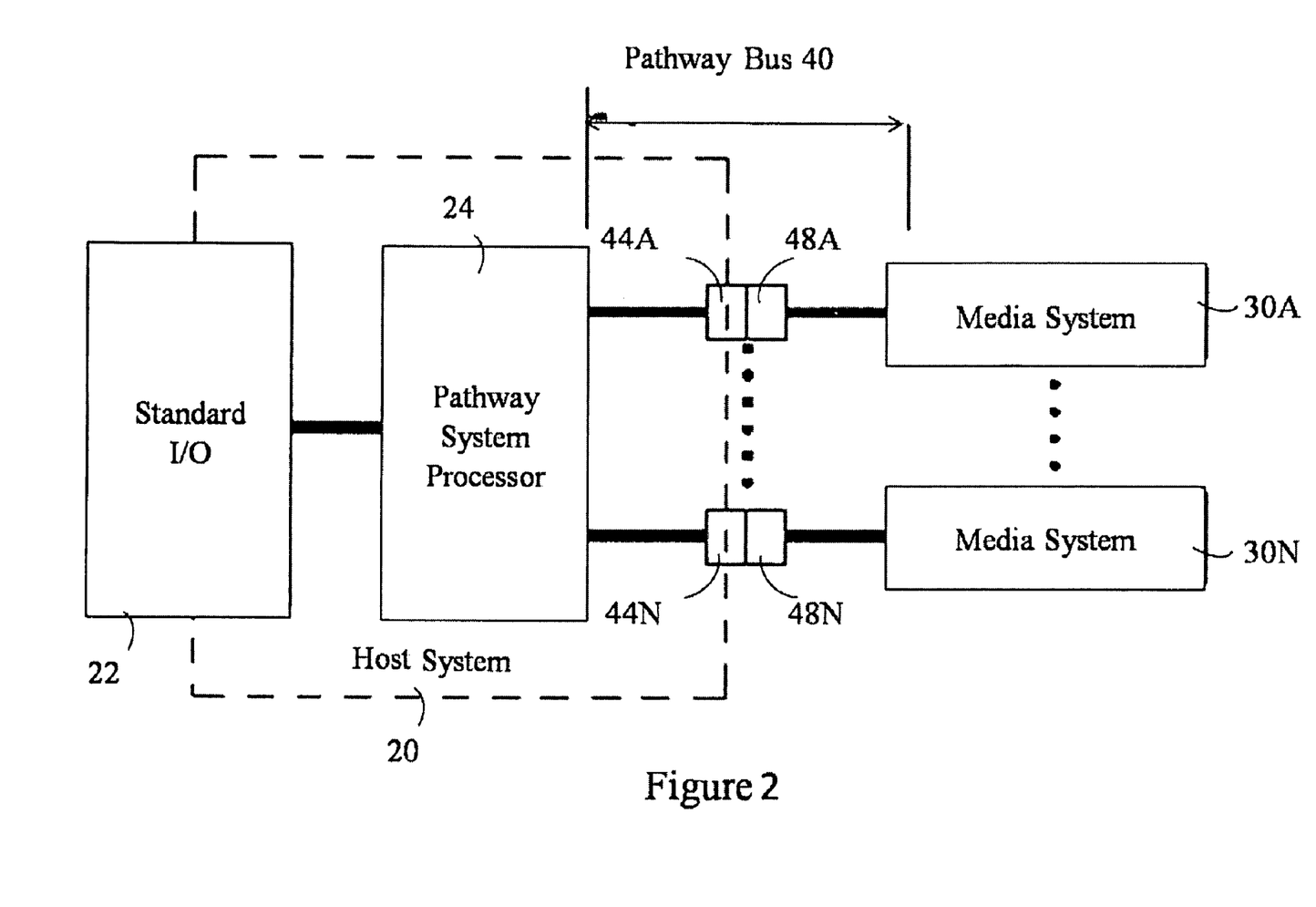
FIG. 2 is a schematic representation of a data recorder for a plurality of cartridges with media storage for the same format according to the present disclosure.
Figure 3:
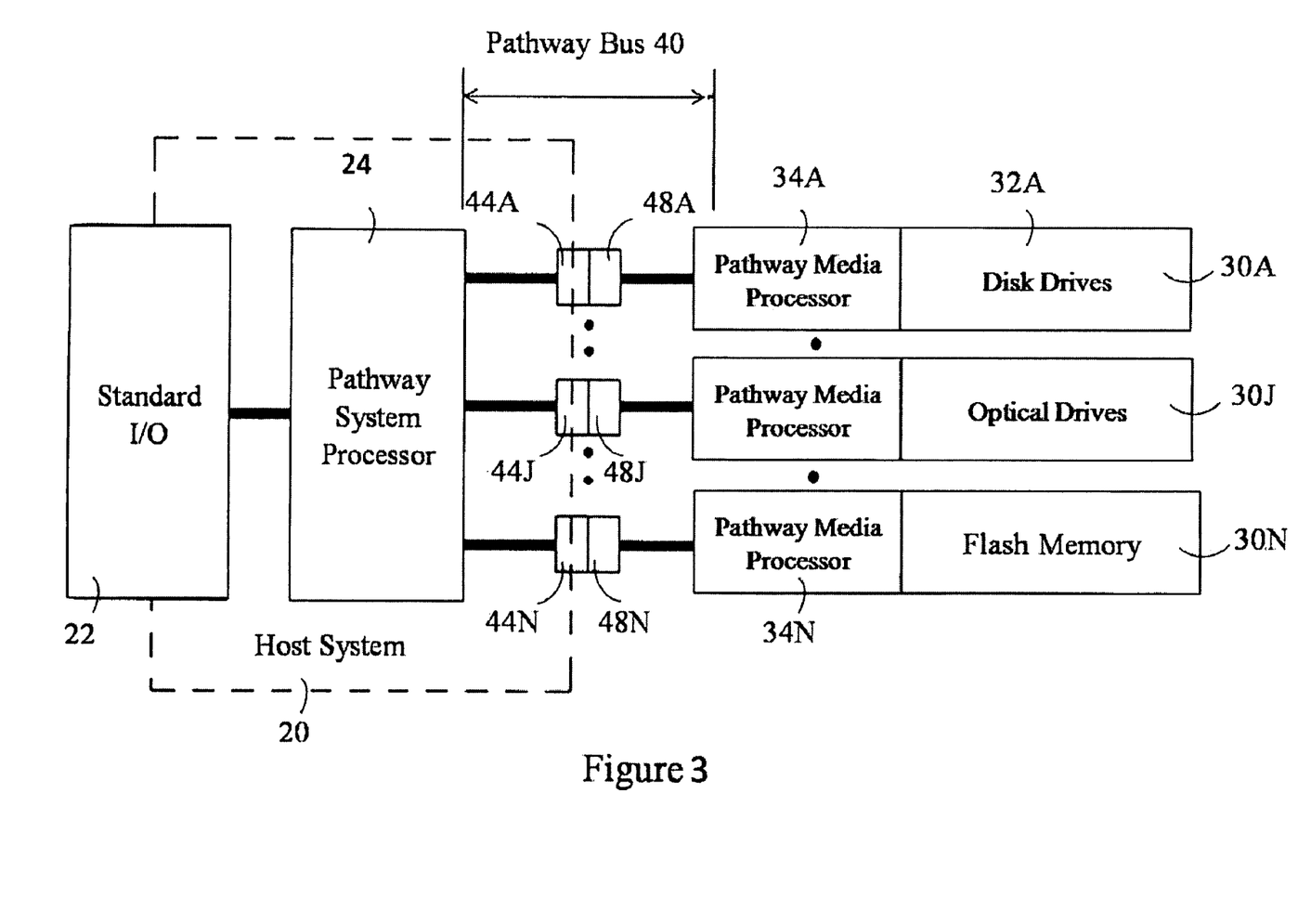
FIG. 3 is a schematic representation of a data recorder for a plurality of cartridges with media storage for different formats according to the present disclosure.

Illustrated in FIG. 2 is a data recorder 10 where in the host system 20 supports a plurality of a media systems or cartridges 30A . . . 30N. The Pathway Bus 40 includes a plurality of pair of connectors 44A . . . 44N and 48A . . . 48N removable connecting the cartridges 30A . . . 30N to the host system 20. Each cartridge includes a media storage 22 and a media processor 24 as in FIG. 1. The media storage 22 may be of the same format or type in FIG. 2 or of different formats or types. A specific example of different media storage formats or types is shown in FIG. 3. Media storage 32A is for example one or more disk drives, media storage 32J is for example an optical drive and media storage 32N is for example a flash memory array.

The present data recorder provides a storage system that is independent of media storage type. It automatically recognizes the media type and presence. It can expand synchronous port width and/or storage depth via multiple cartridges. It disassociates the file system and the media storage from the host system.

A storage system that is independent of media type is achieved by a uniform interface between the host and media systems that isolates or disassociates physical, electrical, and procedural properties of the media from the host system. Physical isolation is provided through the logical isolation of the media system from the media components via separate module(s) assemblies or sub-modules, or separate printed circuit boards (PCB), or separate region(s) of a PCB, or separate chassis and/or racks. A consistent electrical interface is provided regardless of media type. Electrical isolation is provided via a consistent connection interface or Pathway 40 that is used for all media types and provides power, a data read bus, a data write bus, a command bus, and a status bus. The data read, data write, command and status may also be communicated over a single bus as part of a common transmission or packet transfer. The bus or Pathway 40 may be serial or parallel in implementation and the communication data rate can be negotiated upon connection.

Procedural disassociation is provided via a consistent messaging interface that enables data transfer and command/status operations to occur in a means that is independent of media type. This procedural disassociation consists of multiple types of messages between the host and media systems including but not limited to:

| Media Capability Query Messages | |
|---|---|
| Average sustained write rate | Average sustained read rate |
| Burst block-buffer write rate | Burst block-buffer read rate |
| Burst block-buffer write depth | Burst block-buffer read depth |
| Bulk erase capability | Total storage capacity |
| Media Action Messages | |
| Write Data Block to File | Read Data Block from File |
| Bulk erase of media | Eject data |
| Media Status Messages | |
| Action ID | Action Complete |
| Media Inactive | Media Present |
| File Query Messages | |
| Directory Listing | |
| File properties | |
| File Action Messages | |
| Delete File | Create File |
| Rename File | Set File Properties |

Automatic recognition of media type is achieved by the media processor 34 providing the host processor 20 media capability data appropriate for the specific properties of the media type. This maybe transmitted by the media processor 34 when it is connected to the host system 20 or when information is queried from the media system 30 by the host system 20. However, each media processor 34 is designed to specifically accommodate the characteristics of the media within the media storage 32 so that the host system can operate independently and normally in ignorance of the specific details of the media. In this way the media system 30 provides the buffering necessary to disassociate the media requirements from the host system 20. The media system 30 provides a consistent interface to the host system 20 regardless of the media type. Therefore the media system 30 presents only an idealized linear media to the host system 20, by internally handling all procedural requirements to write or read to or from the data.

The present recorder 10 provides means to increase system bandwidth by increasing the number of media systems as illustrated in FIGS. 2, 3, 7, and 8. Each media system 30 is completely independent and contains the same or different types of media than the other media systems. Using the same type of media in two separate media systems, the increase to system bandwidth is twice that of the single media system. Each media system 30 can be populated with its own media type to meet specific requirements such as bandwidth, capacity, or portability.

The present recorder 10 provides methods for adding media systems to the host system 20 to increase the storage capacity of the system. Pathway connections 40 between the host and storage systems are independent providing for additional media systems of same or different capacities, as illustrated in FIGS. 2, 3, 7, and 8. Multiple media systems 30 connected to a common host system 20 provide an incrementally higher system capacity.

The present recorder 10 provides for media presence detection. When the media system 30 is connected to the host system 20, the media Pathway processor 34 sends a notification message to the system Pathway processor 24 with media capability information. The presence of media within the media system 30 is initially detected by the Pathway media processor 34 which transfers media capability information to the host system 20. The data path between the host system 20 and media system 30 provides for partial media system population providing differing media types to be installed in the media storage 32 to meet specific requirements. The recorder 10 also provides a method for media absence by relating generic media information from the media system to the host system.

The present recorder 10 provides methods to disassociate file system specifics from the data. A generic set of file system capabilities are provided that are independent of the data. This includes the ability to write to (append) and read from files contained in the system. The system Pathway processor 24 requires no knowledge of the physical location of data files on the media storage 32 since the files are accessed by reference to their names (IDs) only. Content within a file is addressed via a linear address. All operations on files occur via Media Action Messages and Media Status Messages. File structures and attributes are operated on via File Action Messages and File Query Messages.

The present recorder 10 includes a data buffering system and a power system sized to disassociate data dependencies including write latencies, spin-up, spin-down, thermal warm-up, phase change stabilization, among other physical dependencies from the host system. Independent read and write data buffers are provided and sized to disassociate all physical implementation details from the interface. Data buffering may be provided for instant-on storage recording, regardless of media requirements such as spin-up, thermal warm-up, phase change latency, and so on. Furthermore local electrical power buffering may be provided to guarantee completion of any delayed write operations. Read-ahead buffering can be incorporated to disassociate retrieval latencies.

The present recorder 10 provides for doubling the throughput between the host and media systems. A bi-directional mode is used in applications requiring simultaneous reading and writing between the host and media systems. In bidirectional mode, the Pathway Bus 40 is comprised of two completely independent buses with one bus carrying data from the host system 20 and the other bus carrying data to the host system 20. A separate unidirectional mode provides twice the throughput in a single direction at one time. In this mode, data can be transferred either to the host system 20 or from the host system 20 but not simultaneously. The dual independent Pathway Buses used in the bidirectional mode can be dynamically reassigned to operate in only one direction at a time in the unidirectional mode.

The Pathway Bus 40 is always high-speed however the specific bit width or clock speed can be increased or decreased to meet the needs of the media system 30. The Pathway Bus 40 may be a parallel system which can be configured as two independent sixteen-bit buses of which one can be streaming data to the Media system 30 while the other is streaming media from the Media system 30, or they can both be headed in the same direction for optimal recording and playback speeds. See for example FIGS. 4 and 6. An alternative approach could include four eight-bit buses, as illustrated in FIGS. 5, and 7. The key to the design is the nature of the Pathway Bus 40 which transmits and receives data between two powerful circuits as opposed to the approach taken by existing recorders in which the path between the processor and media is a type of media control circuit.

Figure 4:
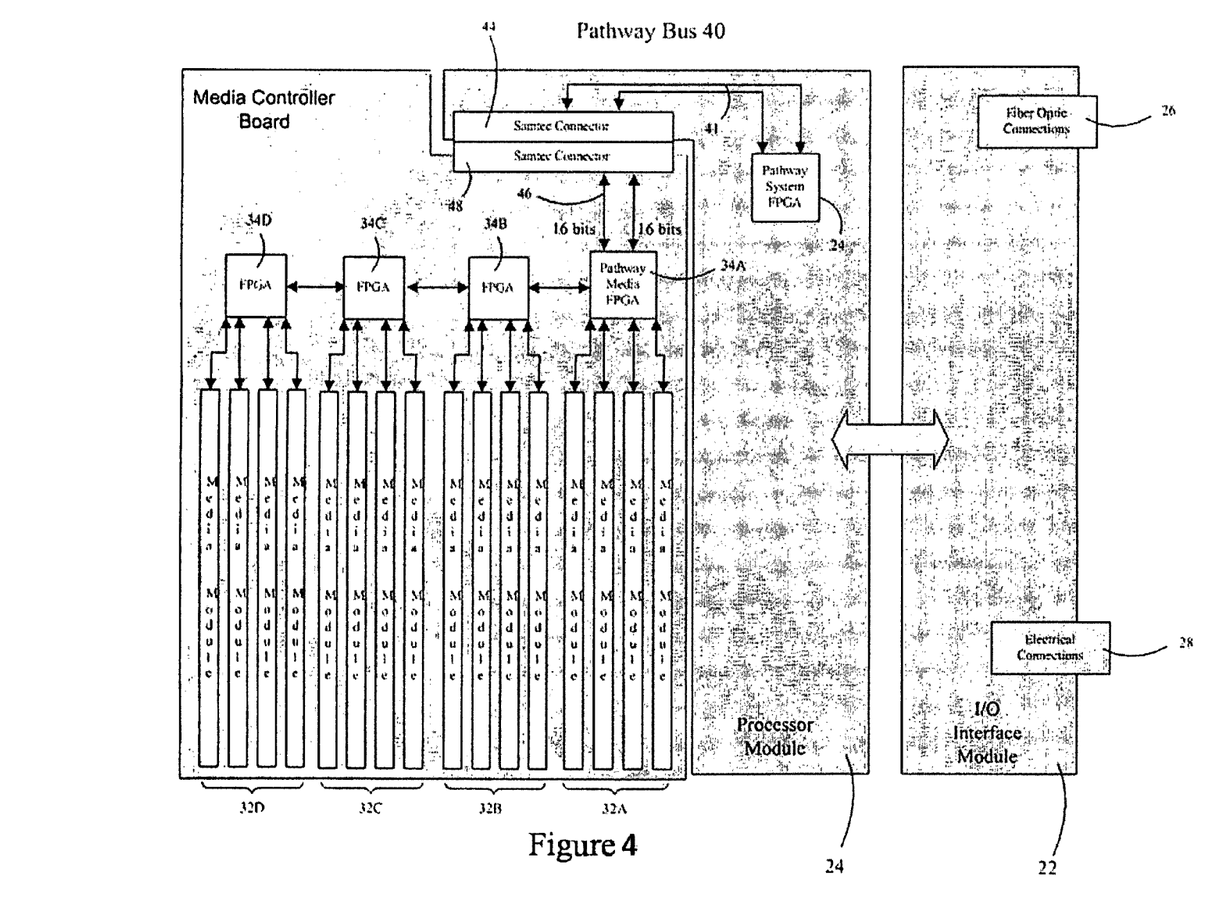
FIG. 4 is a schematic representation of a data recorder for a plurality of flash media storages communicating with the host via a single media processor according to the present disclosure.
Figure 5:
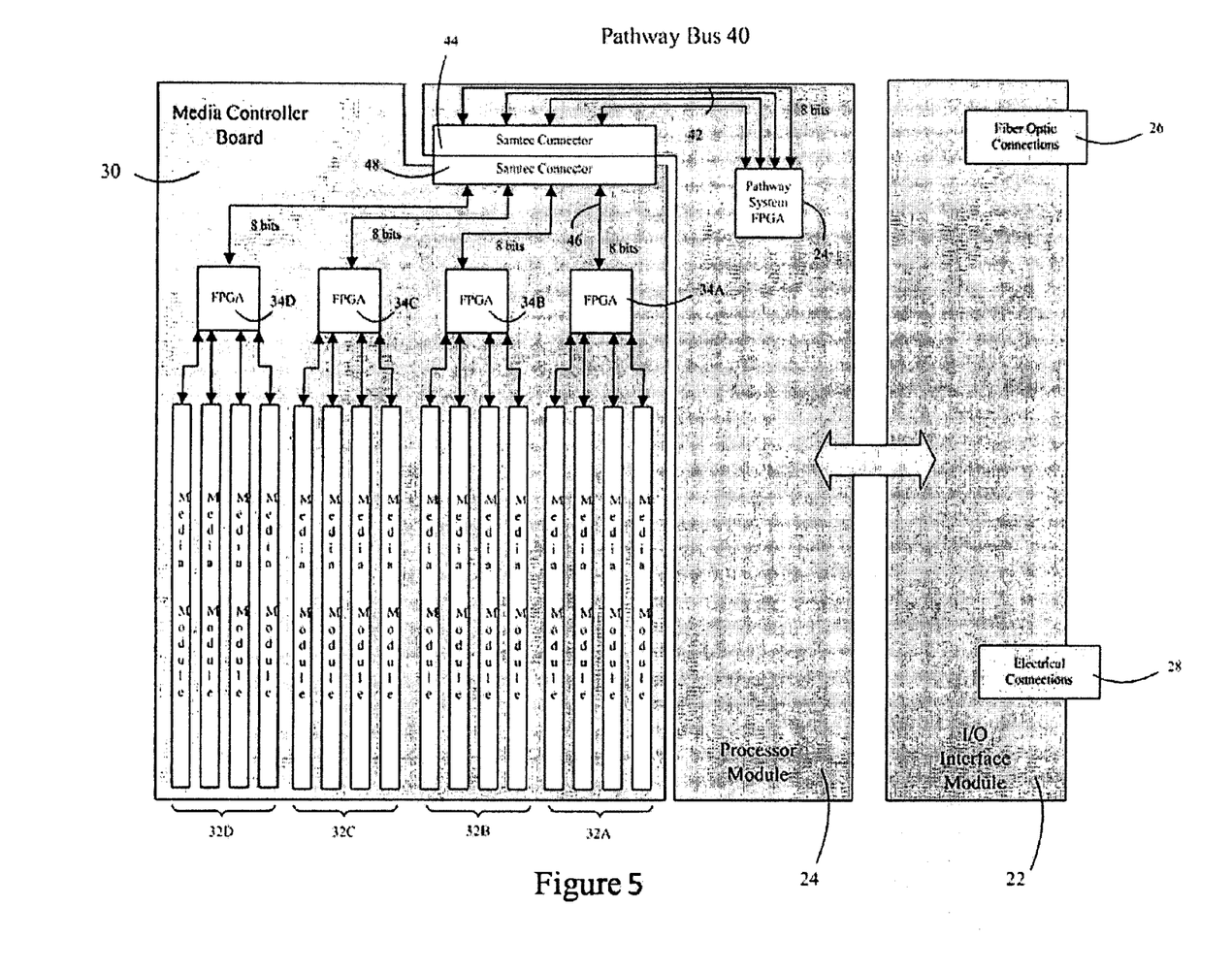
FIG. 5 is a schematic representation of a data recorder for a plurality of flash media storages communicating with the host individually according to the present disclosure.
Figure 6:
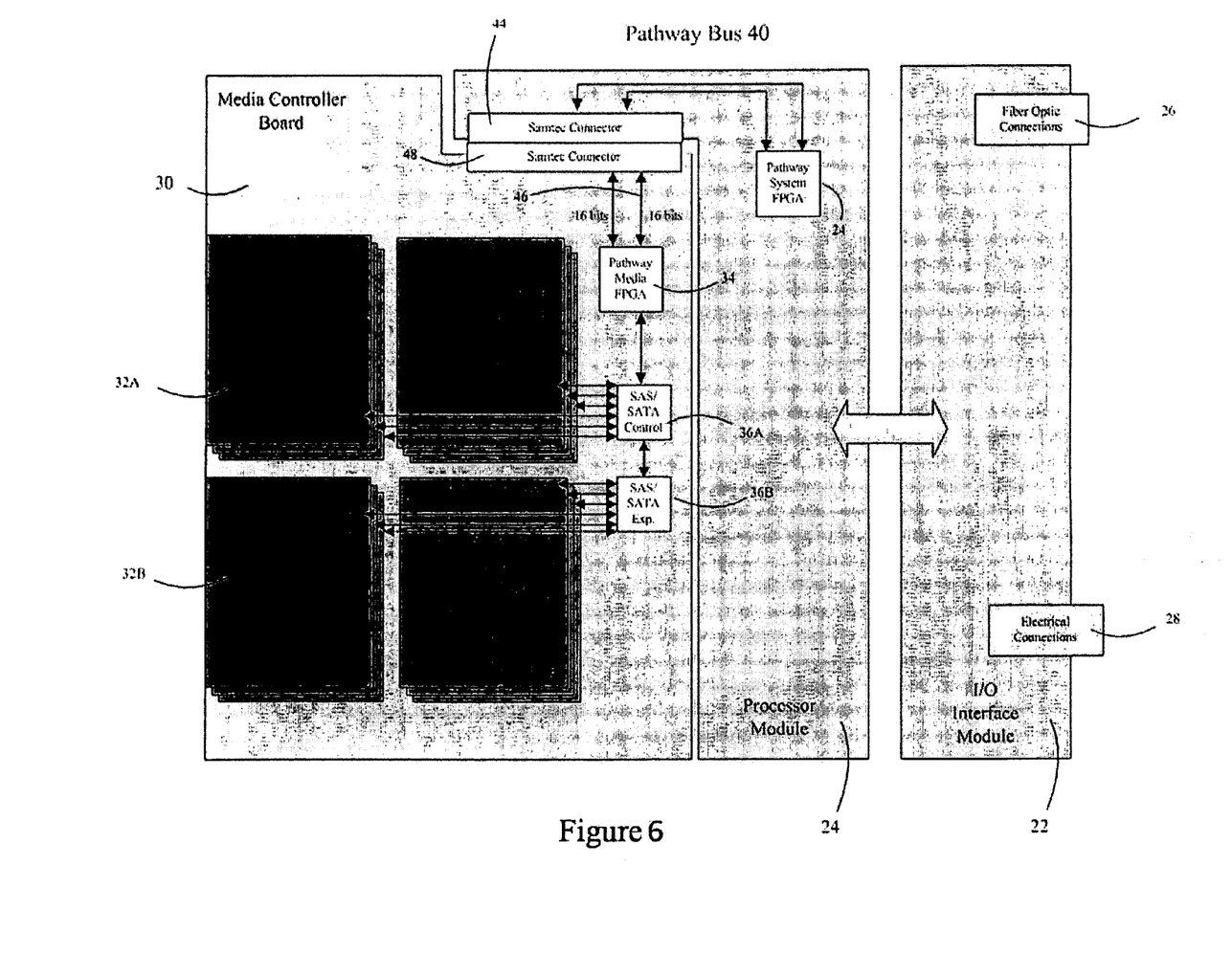
FIG. 6 is a schematic representation of a data recorder for a plurality of disk media storages communicating with the host via a single media processor according to the present disclosure.
Figure 7:
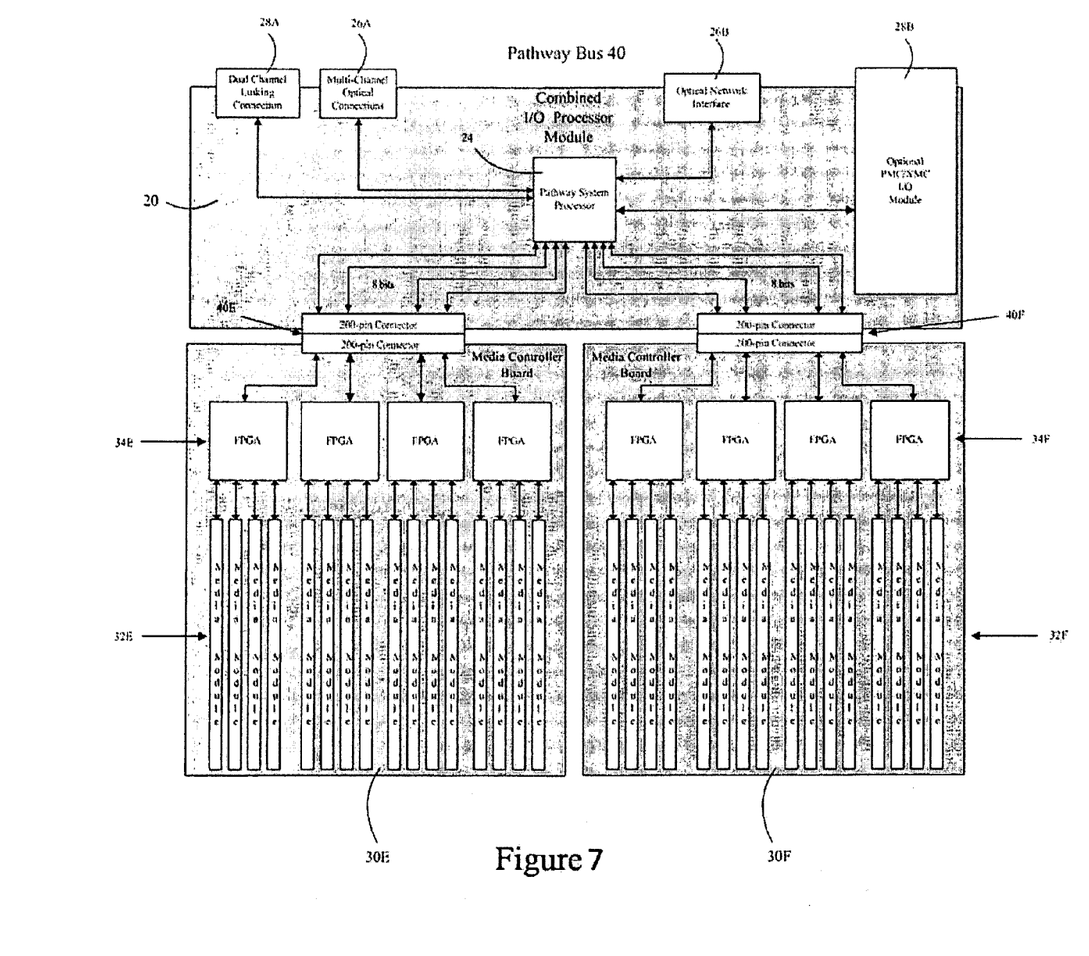
FIG. 7 is a schematic representation of a data recorder for a plurality of cartridges each with flash media storages according to the present disclosure.
Figure 8:
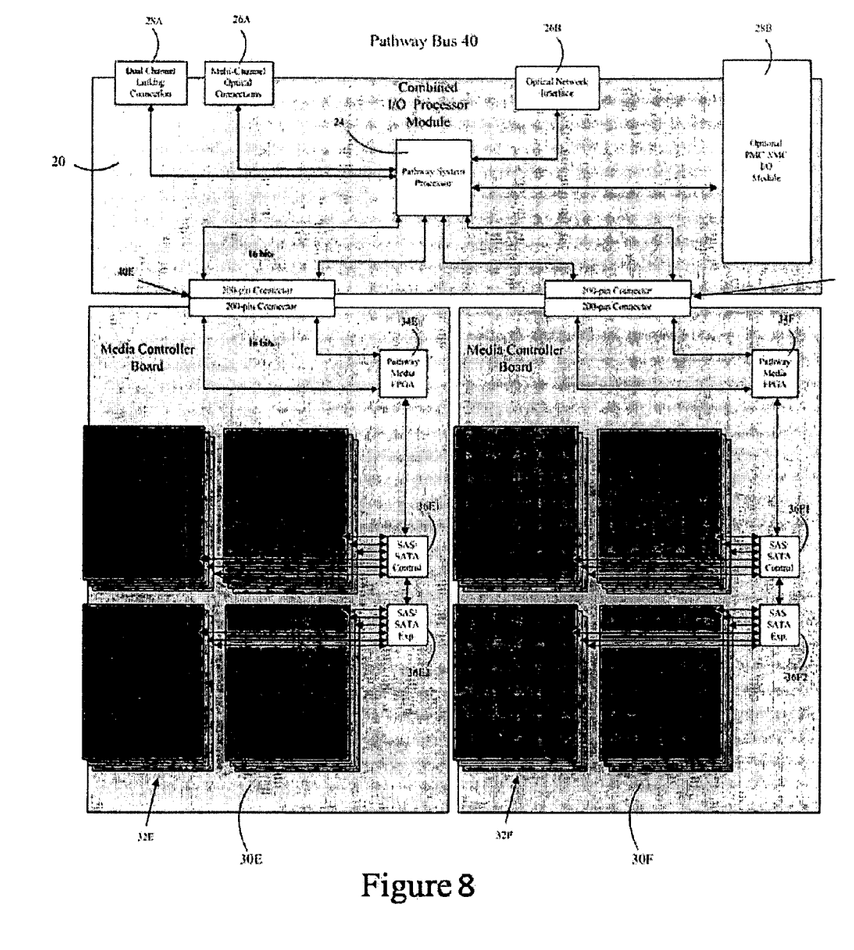
FIG. 8 is a schematic representation of a data recorder for a plurality of cartridges each with disk media storages according to the present disclosure.

The distributed processing architecture between the host system 20 and media system 30 is represented by the square FPGA depiction(s) on the Media Controller Board 30 of FIGS. 4-8. The host processor 24 is connected to the media processor 34 via a removable connector of which half 44 is mounted on the host system 20 and half 48 is mounted on the Media Controller Board 30. Media Controller Boards 30 transmit and receive data in a consistent fashion independent of media type as the media controllers 34 are built-in to the media tray and programmed for a specific media type. The number of processors in the media system 30 can vary depending on volume and type of media being controlled. For example, a flash based media system with 576 flash devices requires four controllers (including the Pathway Circuit that interfaces to the system processor) as illustrated in FIGS. 4, 5, and 7. However, an eight-disk media system only requires one controller chip plus the Pathway Circuit, as illustrated in FIGS. 6, and 8.

An advantage of the present recorder 10 is the lack of user interaction required to configure different media systems within a recorder. The electronics are configured for the media type without the need for the user to provide any additional information. Options to the user may be provided but the system must be able to configure itself without any user interaction if need be.

FIG. 4 shows a Pathway Bus 40 using dual sixteen-bit parallel data paths between the processors and Pathway Circuit. The data path can be any clock rate or bit width. This example includes flash as the media 32.

FIG. 5 shows a Pathway Bus 40 using quad eight-bit parallel data paths between the processor and Pathway Circuit. Other instantiations include serial connections or connections as shown below in which each FPGA 34A-34D is also a Pathway chip but located in the same or separate trays. This example also uses flash media 32A-32D.

FIG. 6 shows a Pathway Bus 40 using dual sixteen bit parallel data paths between the processors and Pathway Circuit. This example uses disk media 32A and 32B. The data-specific interface circuitry 36A and 36B is between the media processor 34 and the media storage 32A and 32B.

FIG. 7 shows a Pathway Bus 40 using quad eight-bit parallel data paths with connections 40E and 40F between the processors and Pathway Circuits using a dual-cartridge configuration 30E and 30F. This example uses flash media 32E and 32F having Media processors 34E and 34F.

FIG. 8 shows a Pathway Bus 40 using dual sixteen bit parallel data paths between the processors and Pathway Circuit. This example shows the Pathway Bus 40 in a dual cartridge configuration 30E and 30F with disk media 32E and 32F. The data-specific interface circuitry 36E1,2, and 36F1, 2, is between the media processor 34E and 34F and the media storage 32E and 32F. The example shows two Media cartridges 30E and 30F but any specific number of cartridges may be used as their connection can be made locally or over cabling throughout a rack system.

Although FIG. 7 shows a flash media and FIG. 8 shows a disk media a combined flash and disk cartridge can be inserted into the same recorder using Pathway connectors 40E and 40F. Additionally, a single tray can include multiple types of media using a single Pathway connector to interface to the host system.

The Pathway Bus 40 is independent of the type of media contained within the Media system 30. The Pathway Bus 40 is capable of handling variable payload size, variable data rate, and variable bus width. The Pathway Bus 40 differs from other peripheral systems in several distinctive ways. Both sides of the Pathway Bus 40 include processors that are not tied to any specific type, interface, or form of data. The Pathway Bus 40 provides connection to any media type that can be housed within the media system 30 while the host processor 24 has no knowledge of the media-specific data. The Pathway Bus 40 changes behavior in response to changes in configuration. Unlike peripheral interfaces such as SATA or IDE, the Pathway Bus 40 varies bus width, payload size, block transfer size, and bandwidth depending on the required performance and the specific media incorporated into the media system 30.

Although the present recorder has been described and illustrated in detail, it is to be clearly understood that the same is by way of illustration and example only, and is not to be taken by way of limitation. The scope of the present invention are to be limited only by the terms of the appended claims.

What is claimed:
1. A data recorder comprising:
an I/O port for receiving data to be stored and outputting data to be read;
a cartridge including a media storage and a media processor connected to the media storage;
the media processor including media storage capability data which is specific to the media storage;
a host processor connected to the I/O port;
a removable bus connector connecting the cartridge to the recorder; and
a pathway bus connecting the connector to the media processor and the host processor
wherein, when the cartridge is connected to the connector, the media storage capability data is transmitted from the media processor to the host processor and the host processor communicates data with the media processor as a function of the received media storage capability data,
wherein the media processor is configured to accommodate a specific type of media storage that it contains so that the host processor operates independently of spe- cific requirements of the media storage and data being transferred from the media storage, and wherein the media processor is configured so that the media storage and media processor cooperate to provide a consistent interface to the host processor regardless of the specific media type being utilized in the media storage, such that the data recorder provides physical, electrical, and software disassociation of the media storage from processes for recording data in the media storage performed by the host processor via media-independent electrical connectivity, media description messaging and categorization.

2. The data recorder according to claim 1, wherein the media storage capability data includes one or more of average sustained read and write rate, burst block-buffer read and write rate, burst block-buffer read and write depth, bulk erase capability and total storage capacity.

3. The data recorder according to claim 1, wherein the host processor transmits commands to the media processor and the media processor transmits status to the host processor.

4. The data recorder according to claim 3, wherein the host processor commands include one or more of write data block to file, read data block from file, bulk erase of media; and eject media.

5. The data recorder according to claim 3, wherein the media processor status includes one or more of action ID, action complete, media inactive and media present.

6. The data recorder according to claim 3, wherein the host processor commands include delete file, create file, rename file and set file properties and the media processor transmits one or more of directory listing and file properties.

7. The data recorder according to claim 1, including a plurality of cartridges each having a different media storage type; and wherein the media storage is programmed to control and communicate with the specific media storage type in the cartridge and to communicate with the host processor as other media processors communicate with the host processor.

8. The data recorder according to claim 1, wherein the connector includes two pathways buses and the host and media processor have a unidirectional and bidirectional modes of communication; in the bidirectional mode, one bus is used for communication in one direction and the other bus in the opposite direction simultaneously and in the unidirectional mode, both buses operate for communication in the same direction simultaneously.

9. The data recorder according to claim 1, including a second cartridge having a media storage and a media processor having media storage capability data and connected to the media storage; and a second bus connector removable connects the second cartridge to the recorder and the second media processor to the host processor by the pathway bus.

10. The data recorder according to claim 1, wherein the cartridge includes a plurality of media storages connected to a respective media processors; and the media processors being one of connected to the bus connector individually and connected to the bus connector via one of the media processors.

11. The data recorder according to claim 1, wherein the cartridge includes data buffers and power system capable of meeting requirements of the media storage in the cartridge.

12. The data recorder according to claim 11, wherein the requirements of the media storage includes one of write latencies, spin-up, spin-down, thermal warm-up, and phase change stabilization.

13. A data recorder comprising:
an I/O port for receiving data to be stored and outputting data to be read;
a cartridge including a media storage and a media processor connected to the media storage;
the media processor including media storage capability data of at least data processing rate and data storage capacity and which is specific to the media storage;
a host processor connected to the I/O port;
a removable bus connector connecting the cartridge to the recorder; and
a pathway bus connecting the connector to the media processor and the host processor,
wherein, when the cartridge is connected to the connector, the media storage capability data is transmitted from the media processor to the host processor and the host processor communicates data with the media processor as a function of the received media storage capability data,
wherein the media processor is configured to accommodate a specific type of media storage that it contains so that the host processor operates independently of specific requirements of the data being transferred from the media storage, and
wherein the media processor is configured so that the media storage and media processor cooperate to provide a consistent interface to the host processor regardless of the specific media type being utilized in the media storage, such that the data recorder provides physical, electrical, and software disassociation of the media storage from processes for recording data in the media storage performed by the host processor via media-independent electrical connectivity, media description messaging and categorization.

14. The data recorder according to claim 13, wherein the media storage capability data further includes one or more of average sustained read and write rate, burst block-buffer read and write rate, burst block-buffer read and write depth, bulk erase capability and total storage capacity.

* * * * *